INVENTOR.
EVAN T. LEWIS
BY
ATTORNEYS.

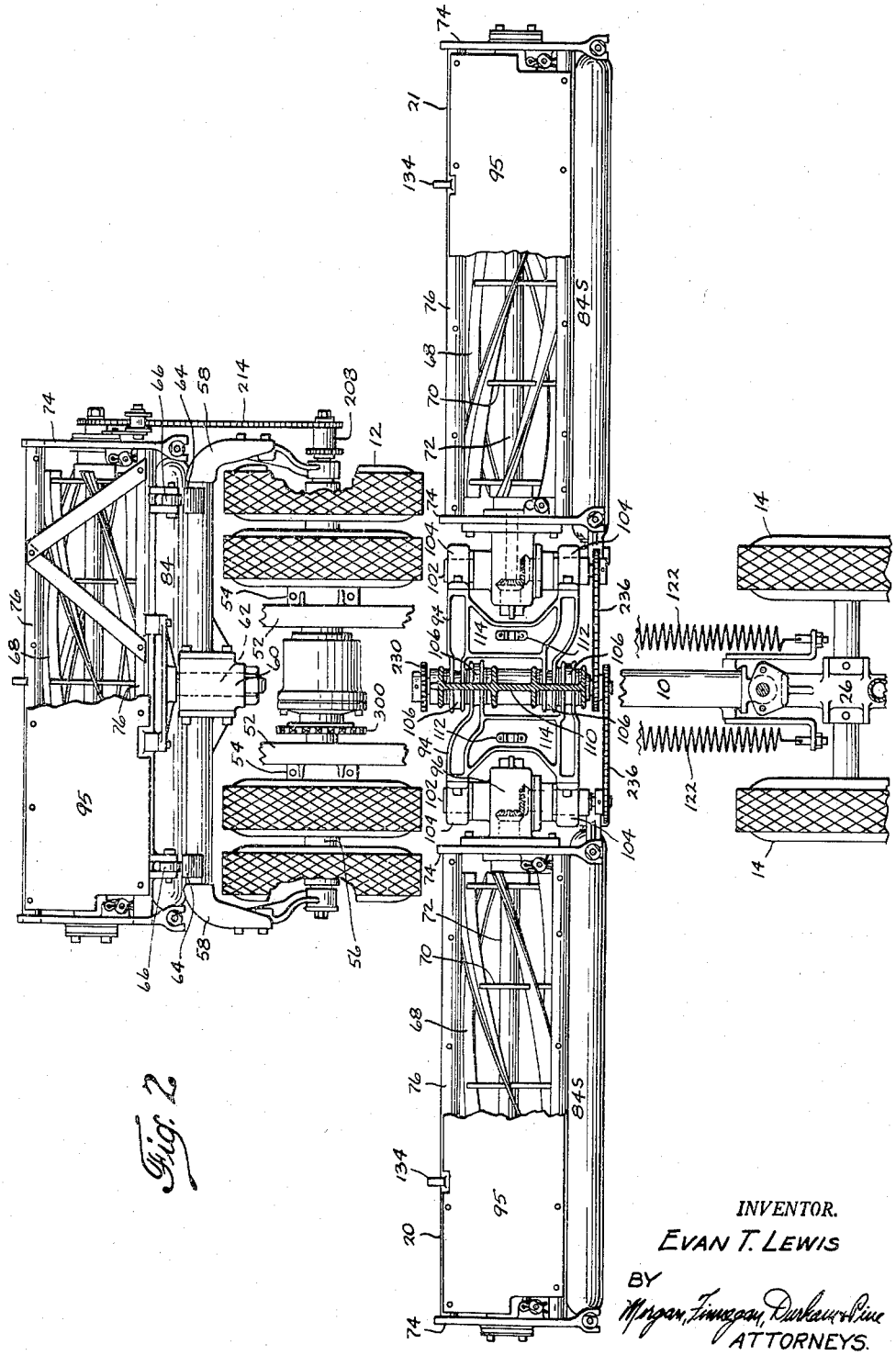

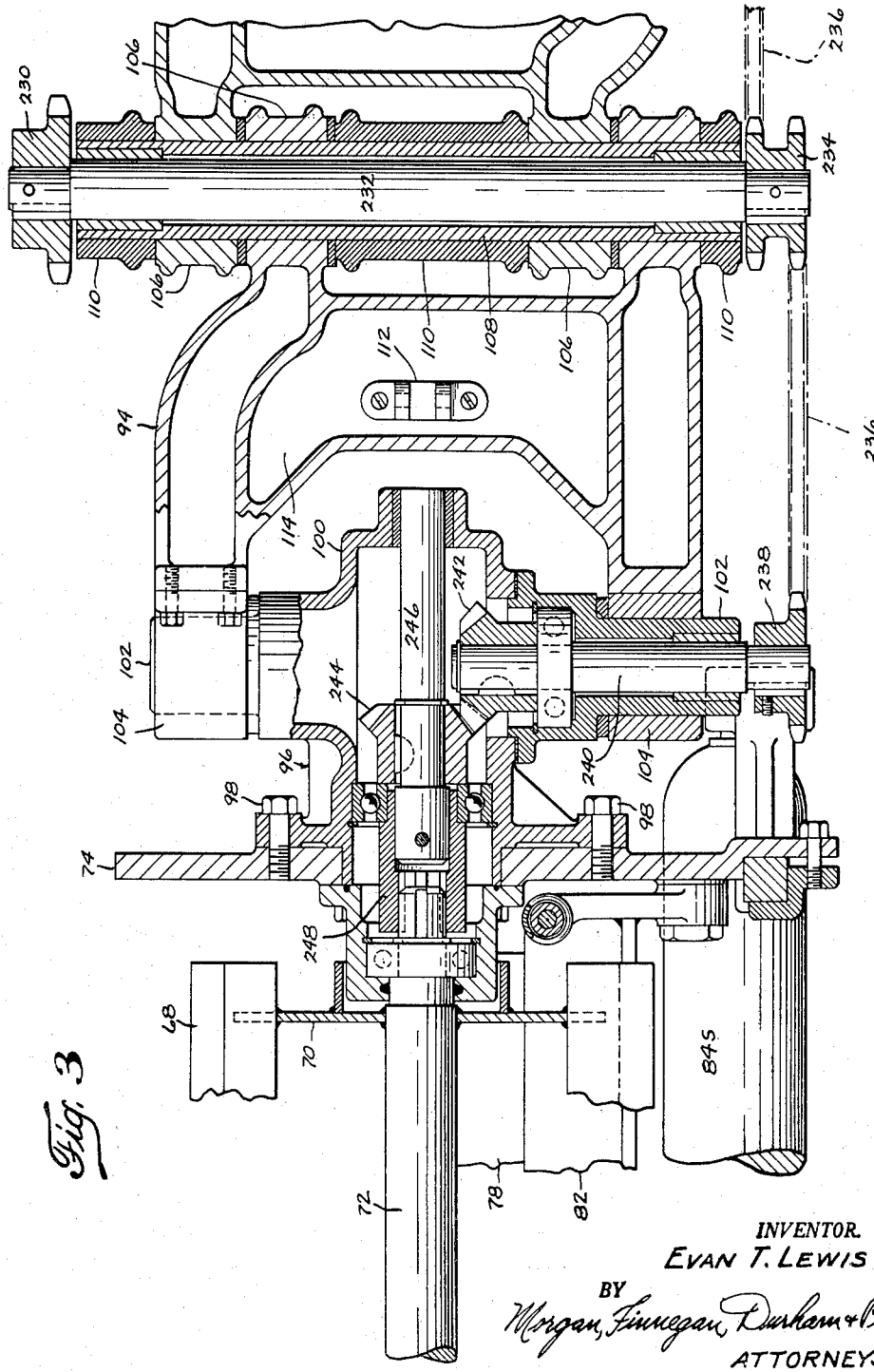

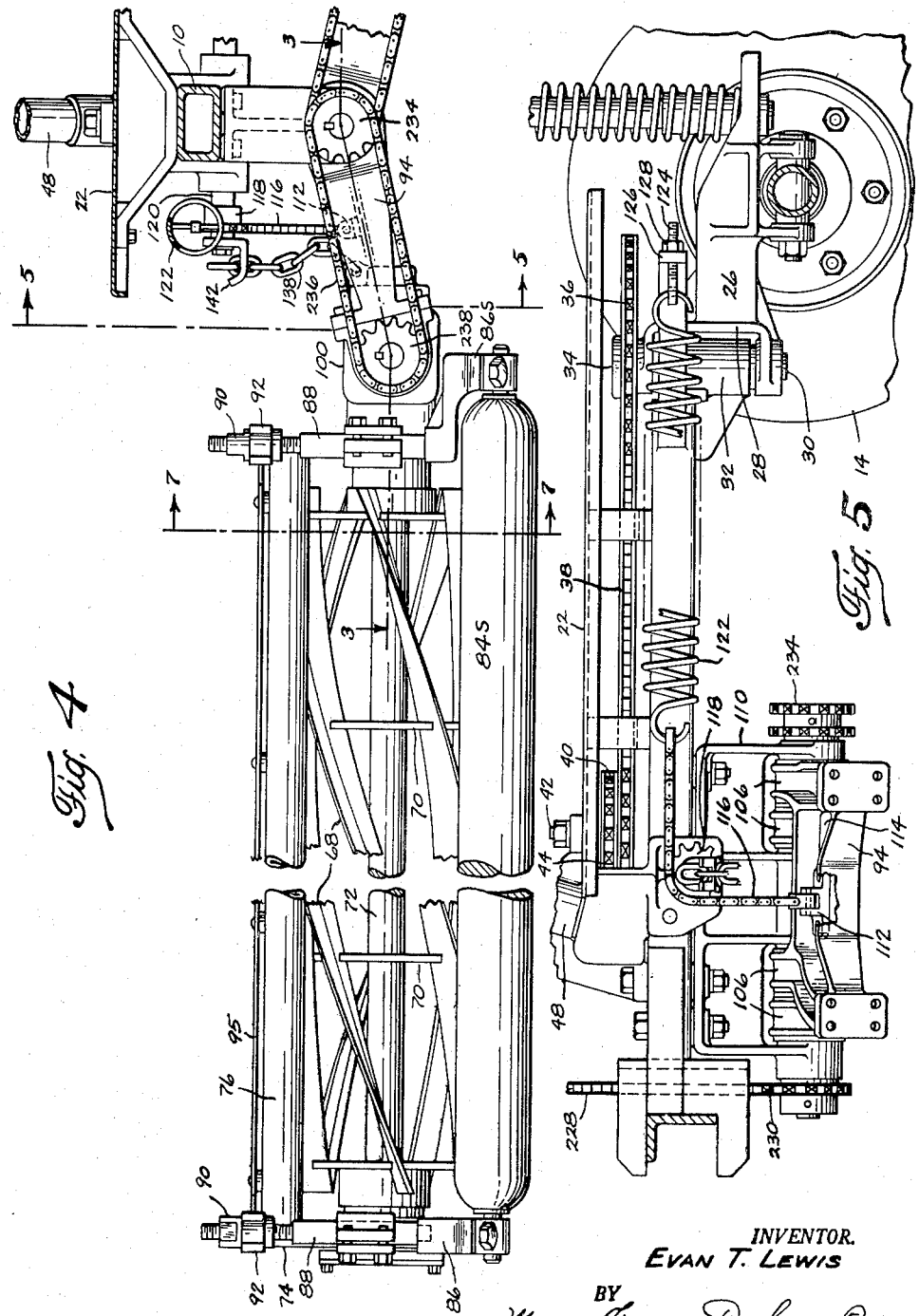

Feb. 14, 1961     E. T. LEWIS     2,971,314
POWER LAWN MOWER
Original Filed Oct. 12, 1955     8 Sheets-Sheet 5
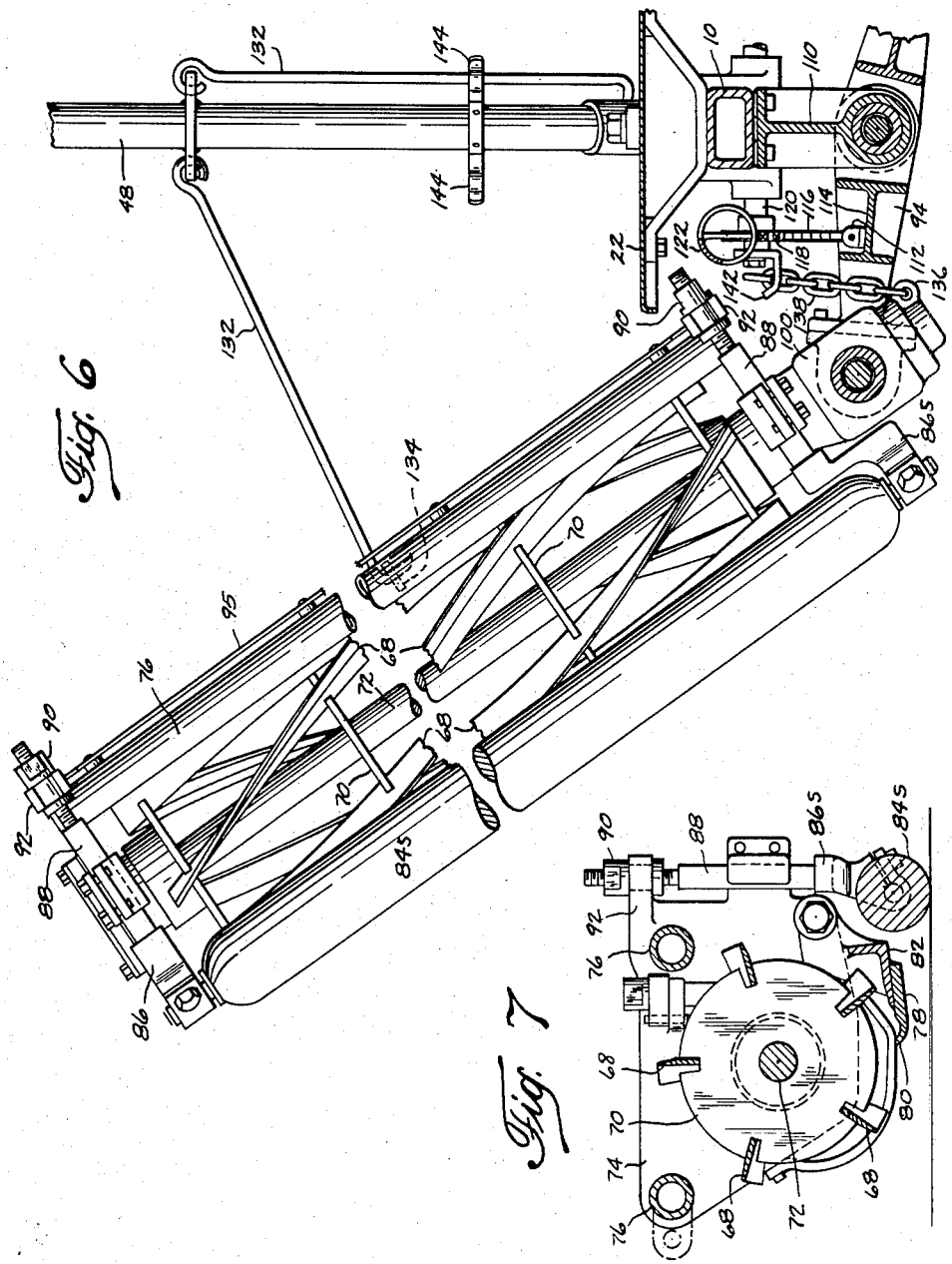
INVENTOR.
EVAN T. LEWIS
BY
*Morgan, Finnegan, Durham & Pine*
ATTORNEYS.

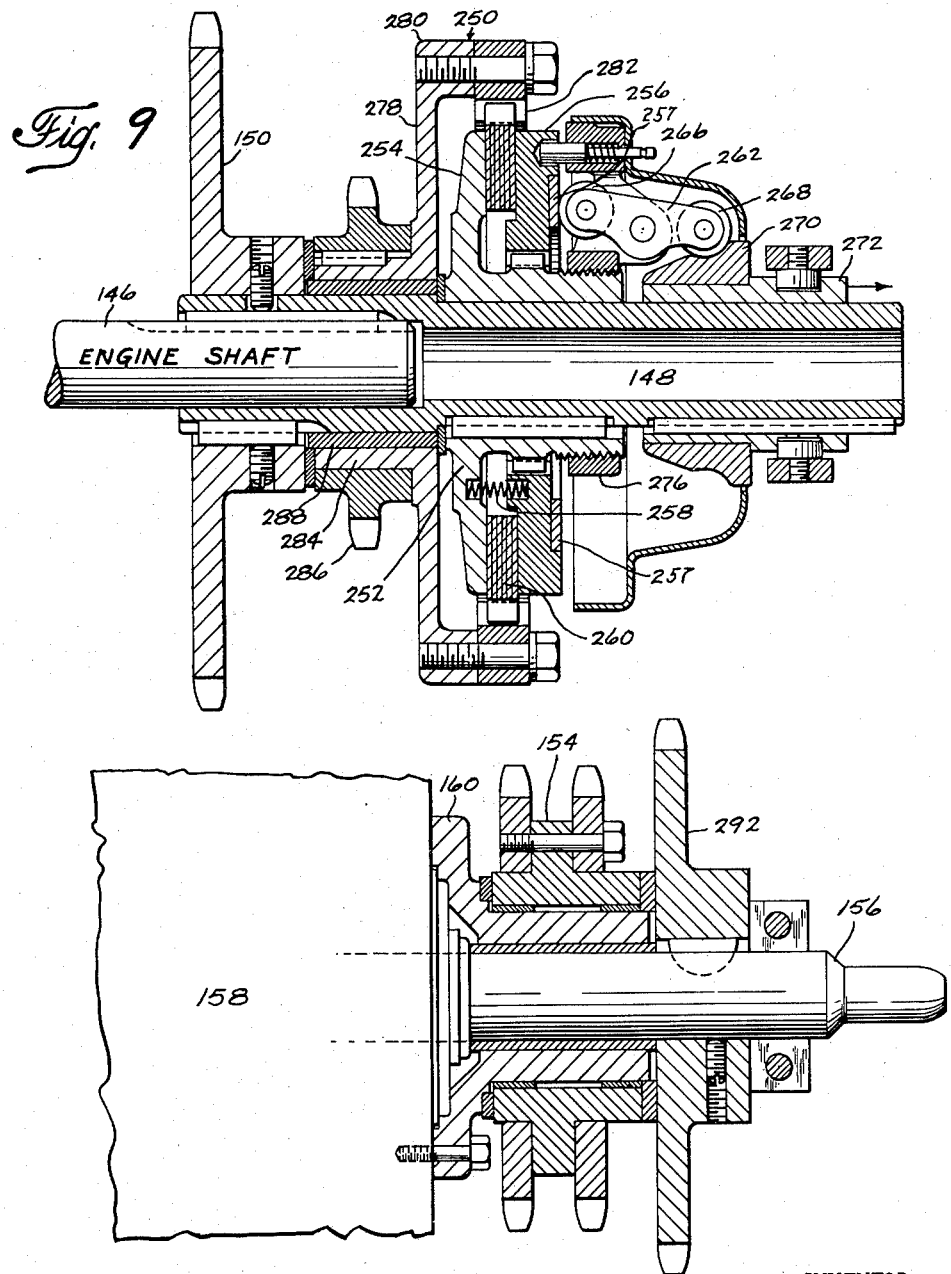

Feb. 14, 1961     E. T. LEWIS     2,971,314
POWER LAWN MOWER
Original Filed Oct. 12, 1955     8 Sheets–Sheet 8
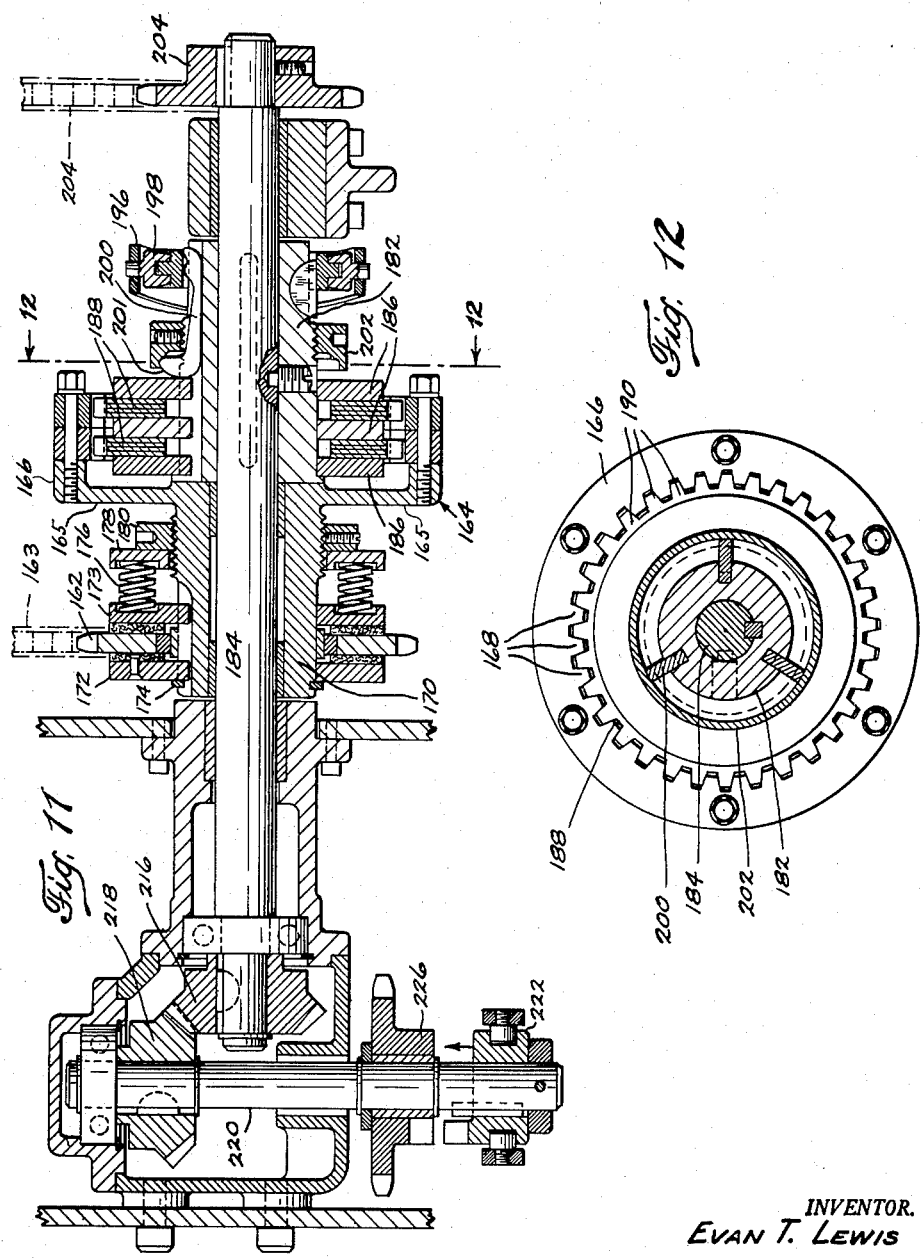
INVENTOR.
*Evan T. Lewis*
BY
*Morgan, Finnegan, Durham & Pine*
ATTORNEYS.

United States Patent Office 2,971,314
Patented Feb. 14, 1961

2,971,314

POWER LAWN MOWER

Evan T. Lewis, Stroudsburg, Pa., assignor to Worthington Mower Company, Stroudsburg, Pa., a corporation of Delaware Original application Oct. 12, 1955, Ser. No. 540,063, now Patent No. 2,909,882, dated Oct. 27, 1959. Divided and this application Apr. 30, 1959, Ser. No. 819,797

2 Claims. (Cl. 56—26)

The application relates to power lawn mowers and more particularly to power lawn mowers having a mowing unit located in front of the mower and additional mowing units disposed at the sides.

This application is a division of and was copending with application Serial No. 540,063, which was filed on October 12, 1955 and was issued as Patent No. 2,909,882 on October 27, 1959 for an invention entitled "Reel-Type Gang Mower." Portions of the written description below and the matters illustrated in the drawings of the present application are not claimed herein but are claimed in said Patent No. 2,909,882.

Power mowers used for cutting grass on golf courses, parks, cemeteries, athletic fields and other large areas, must overcome many difficulties to give a satisfactory cut. The mower must be able to achieve proper cutting of the grass even though the terrain is very irregular, that is, the mower must cut equally well on rough, hilly terrain as on large, flat areas. In addition, the cut should be satisfactory whether the grass be either short or long, coarse or fine. With regard to this latter matter the clip frequency of the mower is a very important factor. Clip frequency is a term denoting the relationship of the speed of the cutting means to the forward speed of the mower. The greater the speed of the cutting means the finer will be the cut and the slower the cutting speed the rougher will be the cut.

In striving to achieve a mower which will satisfactorily overcome the aforementioned problems many various structures have heretofore been tried. One of the most satisfactory designs has utilized individual mowing units positioned both in front of the mower and at either side. This arrangement has the advantage of placing the mowing units in positions where they may be easily seen by the operator thereby enabling him to achieve a better control of the cutting operation. It also results in a better cut because it avoids "streaks" caused by the crushing of the grass by the tractor wheels before the mowing units pass over it.

Such an arrangement, however, presents serious problems in achieving good terrain-following qualities because of the difficulty in adequately supporting the mowing units to withstand rugged use while, at the same time, achieving flexibility required by irregular ground. Heretofore, prior known mower constructions have not been completely satisfactory in this regard. Specifically, it has been difficult to obtain a supporting structure for the front mowing units which will permit a sufficient degree of rocking movement about both a longitudinal and transverse axis of the machine. A further difficulty has been in developing a completely satisfactory method of supporting the side units so as to give substantially even support throughout their length. Another difficulty has been the necessity for providing various take-up devices for the chain drives due to the variations in the length of the transmission systems for the various positions of the mowing units.

Another important difficulty has to do with clip frequency. Heretofore it has been customary to take off the power for the mowing units at a point located after the transmission for the tractor wheels. This results in a constant clip frequency between the cutting speed of the mowing units and the forward speed of the tractor for each time the mower is shifted into a different gear the speed of the mowing units is correspondingly changed. Accordingly, such a mower has but one degree of cutting ability, which is built into the machine at the time the gear system for the mower is designed. In order to achieve acceptable results for many different grass conditions this choice has to be a compromise.

In the applicant's present invention these difficulties are overcome. Applicant has achieved a construction in which the front mowing unit is provided with a rugged supporting means that permits a wide degree of rocking motion about both a longitudinal and transverse axis of the mower. Coupled with an ability to swing up and down, applicant's front mowing unit achieves excellent terrain-following qualities. Additionally, the side mowing units are supported in a manner to give a floating action, that is, with substantially even distribution of the weight along the length of the mowing units and provision is made whereby the length of the power drive system is constant whether the units are in a cutting or retracted position.

Furthermore applicant's mower construction permits variations in the forward speed of the mower without altering the speed of the mowing units, thereby achieving variations in the clip frequency. Thus applicant's mower may be controlled to give the proper clip frequency for whatever grass condition is being encountered. For example, it is now possible, with the applicant's invention, to produce a power mower which will be able to give a completely satisfactory cut on the relatively long grass of a golf course "rough," the shorter grass of the fairways and the still shorter grass bordering the greens.

Briefly and generally, the applicant's invention comprises a frame provided with a plurality of wheels so as to be movable. Disposed in front of the frame and attached thereto is a front mowing unit and similar mowing units are disposed at the sides of the frame. A gasoline engine, or any other suitable power source, is mounted on the frame and supplies power for the mowing units and for the wheels of the frame. Power transmission means are provided between the engine and the mowing units and the engine and the wheels and are arranged so that the speed of the wheels may be varied without varying the speed of the mowing units. Preferably this is achieved by locating the power take-off point for the mowing units ahead of the speed changing means for the traction wheels so as to permit varying speed ratios between the engine and the traction wheels but only a constant speed ratio between the engine and the mowing units.

In general arrangement the engine is preferably mounted on the frame at the front so as to provide room on the remainder of the frame for a seat and platform to support the operator and for suitable steering apparatus by which the mower may be guided. The traction wheels for the mower are located at the forward or front part of the frame so as to support the weight of the engine and the various transmission means while a steering wheel, or wheels, is positioned at the rearward end of the frame and pivotally joined thereto. Suitable mechanical linkages connect the latter wheels with the steering apparatus.

The means for attaching the front mowing unit to the frame generally comprises a yoke-like member pivotally connected to the frame, preferably at the axles for the front wheels, so as to be swingable up and down with respect to the ground. Provision is made for substantial rocking movement of the unit about a longitudinal axis of the mower so that the mowing unit may readily adapt itself to mowing on the side of a hill. To this end the front mowing unit is preferably provided with a relatively short, but rugged, cylindrical shaft forming an extension on the central portion thereof which is journalled within a correspondingly shaped bushing or bearing secured to the center of the yoke-like member on the frame.

Each of the side mowing units is supported so as to distribute its weight evenly along its length by joining the unit to the frame with a double pivoted link member, that is, a link member which is pivotally connected to both the frame and the mowing unit. This arrangement permits the side units to assume an angle for proper cutting of the grass regardless of the position of the frame. Thus, the mower may cut two flat surfaces of different levels while the mower travels along the inclined surface between them. Additionally, each link member is provided with spring means connected to the link and the frame so as to constantly urge the link in an upward direction, thereby avoiding gouging of the ground by the mower at the pivot point between the link and the mowing unit. Preferably the spring means are disposed longitudinally along the frame so as to be out of the way of the operator and are joined to flexible connectors secured to the link members, said connectors passing over movable direction changing devices. Further protection against gouging of the turf at the critical point of pivot between each side mowing unit and its link member is achieved by substantially increasing the length of the rollers for the mowing units so that they extend inwardly toward the mower past the inner end of the mowing unit to a point adjacent the pivot point between the link and the mowing unit.

For the purpose of obtaining freedom of movement for the side mowing units coupled with a constant length of their power drive applicant provides a transmission system for each unit in which the centers of rotation for the transmission means coincide with the pivot centers of the mowing units and the link members. In the preferred form of the invention a drive shaft is provided on the frame and positioned so that its center coincides with the center of the pivotal connection between the frame and a link member. Each mowing unit is provided with a pair of oppositely disposed extensions that are journalled in the outer end of the link member to form the pivotal connection between the frame and link. A rotary shaft is also provided on the mowing unit and positioned so that its center coincides with the center of the extensions. Both this shaft and the drive shaft may advantageously be disposed longitudinally of the frame and the main shaft of the cutting means for the mowing units may be positioned transversely to the frame. Suitable gear elements, or other power transmission means, are provided between the rotary shaft and the main shaft and the rotary shaft and the drive shaft, whereby the power of the engine may be transmitted to the mowing units.

It will be understood that the foregoing general description and the following detailed description as well are exemplary and explanatory of the invention but are not restrictive thereof.

Of the drawings:

Fig. 2 is a top plan view partly broken away and in section with the upper portion of the mower taken away showing the arrangement of the mowing units and traction and steering wheels;

Fig. 3 is an enlarged top sectional view showing the pivotal connections between a side mowing unit and the frame and the transmission means therefor;

Fig. 4 is an enlarged rear view with parts broken away and in section of a side mowing unit showing the supporting structure therefor;

Fig. 5 is a side view partly in section taken along the line 5—5 in Fig. 4, looking in the direction of the arrows;

Fig. 6 is an enlarged rear view with parts broken away and in section of a side unit in a raised position;

Fig. 7 is a view, partly in section, taken along the line 7—7 in Fig. 4 looking in the direction of the arrows;

Fig. 9 is an enlarged vertical sectional view through the center line of the clutch for the traction wheels;

Fig. 10 is a similar view showing the arrangement of elements on the shaft of the transmission for the traction wheels and mowing units;

Fig. 11 is a horizontal sectional view through the main clutch for the mowing units; and Fig. 12 is a sectional view taken along the line 12—12 in Fig. 11 looking in the direction of the arrows.

Figure 1:
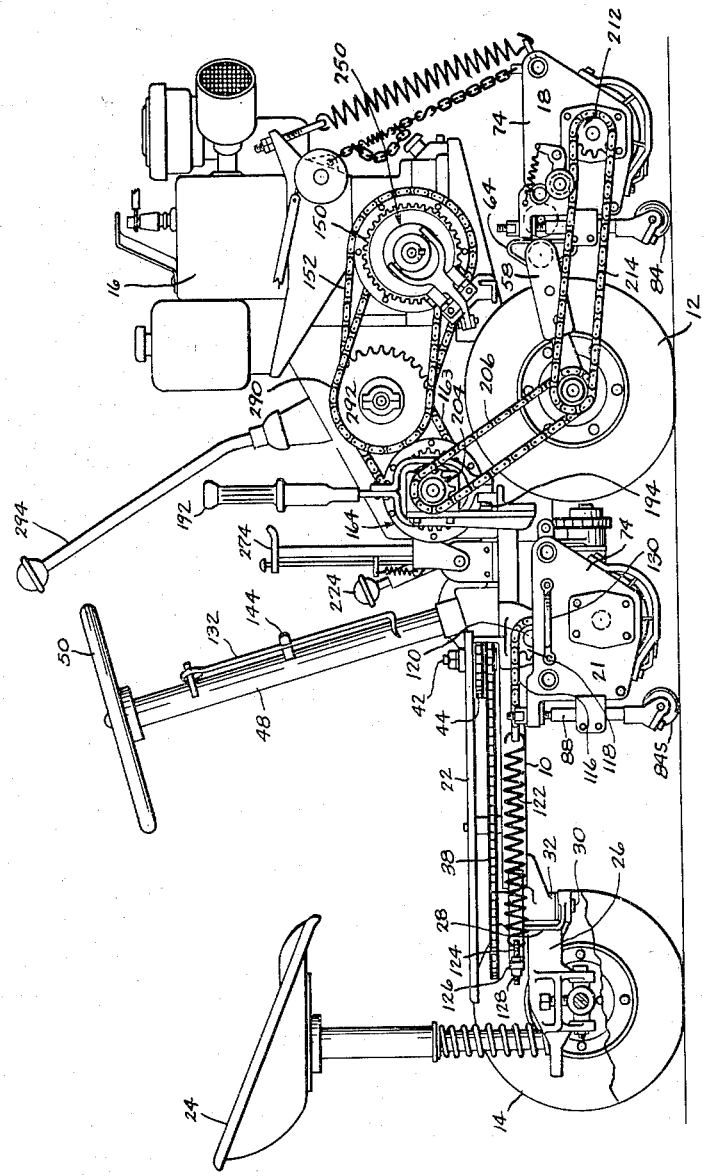
Fig. 1 is a side elevation of a power mower constructed in accordance with the preferred form of the invention.
Figure 8:
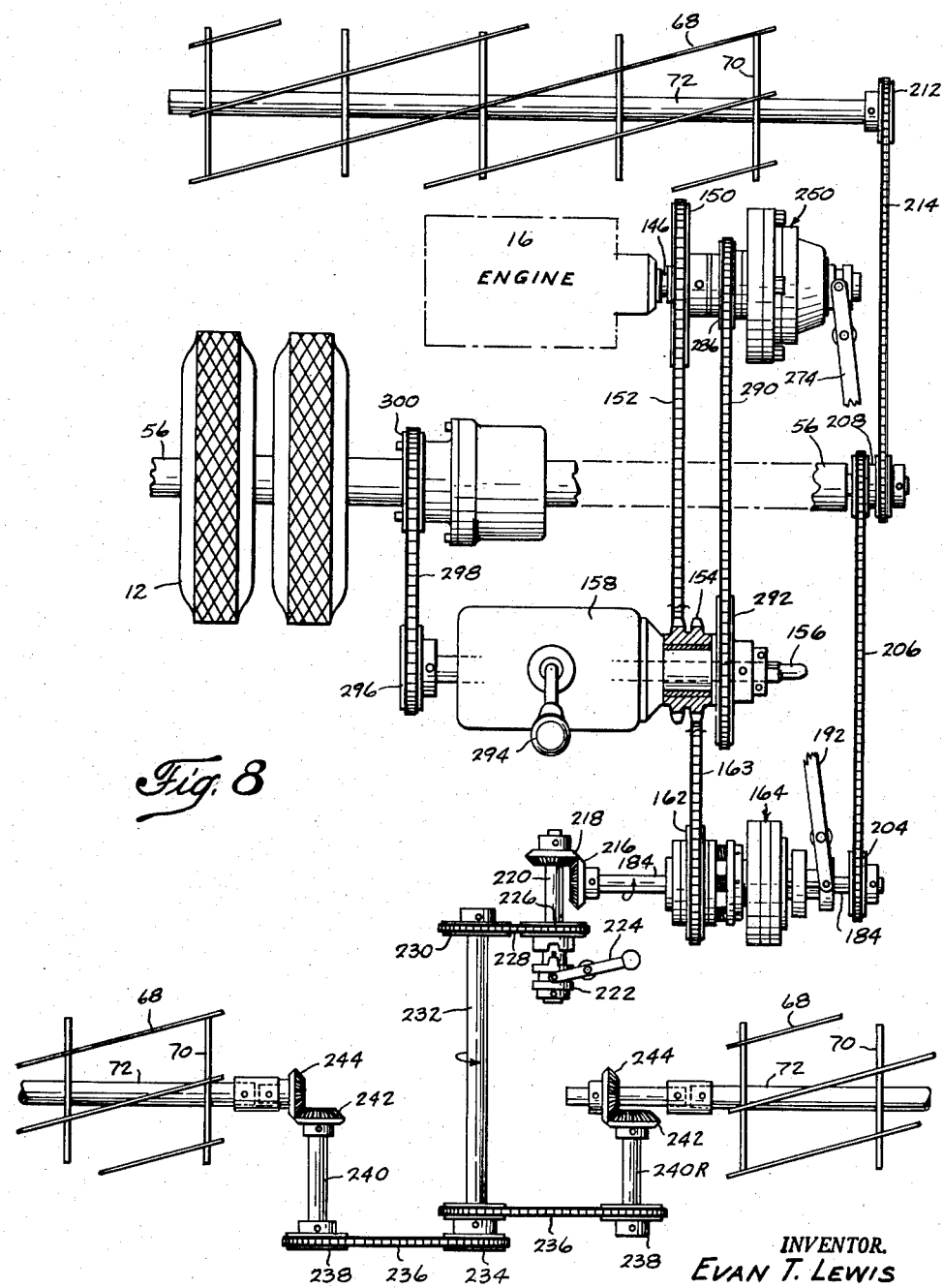
Fig. 8 is a schematic view showing the various transmission systems for the mowing units and the traction wheels.

Referring now to the drawings and at first to Fig. 1 there is shown a power mower constructed in accordance with the teachings of the applicant's invention. The mower generally comprises a frame 10 having a plurality of traction wheels 12 secured thereto to propel the mower over the turf being cut and steering wheels 14 at the rearward end portion of the frame by which the mower may be guided. At its forward end the frame 1 supports an engine 16 which furnishes the power for the mower, and suitable power transmission means are provided whereby the power of the engine is transmitted to the mowing units and the traction wheels. In the form of the invention shown in the drawings the mower is provided with one front mowing unit 18 and two side mowing units 20, 21, each side unit being disposed to one side of the frame 10. A platform 22 and a seat 24 are provided on the mower to support an operator, the platform being secured to the frame 10 and the seat resiliently mounted to the steering wheel chassis 26. Chassis 26 is pivotally secured to the frame 10 by the yoke 28 which is journalled to a stud shaft 30 in the boss 32. The upper portion 34 of the yoke 28 carries a sprocket wheel 36 that is connected by an endless chain 38 to a pulley and sprocket wheel 40 rotatably mounted on another stud shaft 42 within the platform 22. A chain 44 connects the pulley and sprocket wheel 40 to a sprocket wheel (not shown) on the steering column 48. A steering wheel 50 on the column 48 enables the operator to control the direction of the mower travel by maneuvering the position of the steering chassis 26 with respect to the frame 10.

Adjacent the front of the mower the frame 10 takes the form of two parallel longitudinal beams 52 (Fig. 2) to which are secured the supports 54 for the axle 56 of the traction wheels 12. Pivotally secured to the ends of the axle 56 is a yoke-like member 58, provided at its central portion with a heavy bearing 60. It is to this yoke 58 that the front mowing unit 18 is attached and to this end the mowing unit is provided with a cylindrical extension 62 adapted to be rotatably received within the bearing 60 as to enable the mowing unit 18 to rock about both a longitudinal and transverse axis of the mower. A pair of guide members in the form of runners 64 are secured to the yoke 58 adjacent the ends of the mowing unit 18 and act as support plates for the rollers 66 to give the unit support against shock during its terrain-following motions. As shown in the drawing, Figure 2, the rollers 66 are mounted at the ends of the front mowing unit 18 and the runners 64 are located on the yoke 58 in registry with the rollers 66. The guide members 64 do not ordinarily contact the roller 66.

In the mowing units shown in the drawings for purposes of illustration, the cutting means are of the common reel type in which a plurality of spirally-shaped blades 68 (see Fig. 7) are fixedly mounted in circular support plates, or rings 70 so as to form a generally cylindrical assembly. The plates 70 are fixed to a rotary shaft 72 journalled for rotation in the end plates 74 joined together by the end plate support members 76. A bed knife 78, having a cutting edge 80, is secured between the end plates 74 by means of the angle bar 82. Mounted behind the blades and in contact with the turf is a roller 84 having each end portion rotatably fastened to a bracket 86 on the end of a threaded rod 88 that depends from the end plate 74. Adjustment of the height of the cut by the reel is controlled by a nut 90 threaded onto the rod 88 on the top side of the lug 92 in the end plate 74 by which the roller may be lowered or raised with respect to the bed knife 78. A cover, or grass shield, 95 is secured to the top of the unit to prevent the cut grass from being flung upwardly into the operator's face.

The side mowing units 20, 21 are each connected to the frame 10 by means of link members 94. To this end the inner end plate 74 of each unit is provided with an extension 96 which is bolted to the plate 74 by the studs 98. Preferably the extension takes the form of a hollow casing having a generally cylindrical hub 100 with oppositely disposed stud shafts 102 extending from either side of the hub, which shafts act as pivot points for the link member 94. Accordingly, each link member 94 is provided with a pair of spaced bushing housings 104 at the outer end portions thereof to pivotally receive the stud shafts 102 on extension 96. The inner end portions of the link members 94 are also provided with bushing housings 106 adapted to be pivotally mounted on a longitudinally disposed hollow rod 108 fixedly positioned in a bracket 110 suspended from the frame 10. Thus each side mowing unit is attached to the frame through a double pivot which permits the unit to accommodate itself to the level of the turf with respect to the mower frame and also to the particular inclination of the turf.

To obtain a relatively uniform weight distribution over the length of the side mowing units and especially to avoid exerting a downward force at the point of pivot between the unit and the link, each link 94 is provided with a resilient support constantly urging it in an upward direction. A small bracket 112 is fixed to the upper face 114 of each link. To the bracket 112 is fastened a chain 116 which passes over a sprocket wheel 118 on a stud shaft 120 fixed in the frame 10. The opposite, or free, end of the chain 116 is fastened to a spring 122 preferably disposed longitudinally next to the frame 10 and secured to a threaded stud 124 in a lug 126. Adjustment of the tension of the spring is effected by varying the position of the stud 124 on the lug 126 by means of the nut 128.

Further support for the side mowing units adjacent the critical pivot point between the unit and its connecting link member is provided by applicant's roller construction in which the inner bracket 86S for the roller 84S is formed in the shape of an exaggerated goose neck and the length of the roller is made greater than normal so as to extend inwardly toward the mower past the end of the blades 68 to a point adjacent the critical pivot point and beyond the inner end plate 74 (see Figures 2, 4 and 6). Any tendency of the side unit to dig into the turf at this pivot point is effectively resisted by the pressure of this increased portion of the roller against the ground.

However, it should be understood that the roller construction for the front mowing unit (see Figure 2) does not embody these structural features. Unlike the side units, the inner bracket 86 of the front mowing unit is not formed in the shape of an exaggerated goose neck; and further unlike the side units, the roller 84 of the front unit is only slightly longer than the blades 68 and is positioned within the end plates 74.

The side mowing units 20, 21 are adapted to fold upwardly out of the way whenever it is desired to travel without cutting (Fig. 6). Accordingly, the outer end plate 74 of each unit is provided with a handle 130 by which the operator may swing the units. Suitable holding means are provided to hold the units in their retracted positions and the steering column 48 carries a pair of hook arms 132, the end portions of which are adapted to engage openings in the lugs 134 mounted on the top front stiffening bar 76. In order to prevent the inner end of the mowing units from coming too close to the ground when in the retracted position a lug 136 is provided on the inner end of the hub 100 of extension 96 and a chain 138 is attached to the lug. The opposite end of the chain 138 is passed between a catch fashioned by two parallel fingers 142 secured to the stud shaft 120 fixed at the frame 10. As the length of the chain 138 is quite short the side mowing unit is prevented from gouging into the turf due to jackknifing at the critical pivot point. When the units are in their cutting positions the hook arms 132 are held out of the operator's way by the clamps 144 fastened to the steering column 48.

Referring now to Figs. 8–12 for a description of the various power transmission means there is shown (in phantom) a schematic representation of an engine 16. The engine shaft 146 extends outwardly from the engine casing and has mounted on and keyed to its outer portion a hollow sleeve 148. Keyed to the inner end of the sleeve 148 is a sprocket wheel 150 so that rotation of the engine shaft 146 and sleeve 148 causes the sprocket wheel to rotate also. Sprocket wheel 150 is connected by an endless chain 152 to a double sprocket wheel 154 mounted adjacent the speed changer, or gear box, 158. The double sprocket wheel 154 is mounted for free rotation on the hub 160 in which the shaft 156 for the speed changer is rotatably journalled. From the double sprocket wheel 154 power is transmitted to another sprocket wheel 162 immediately adjacent the clutch 164 for all three of the mowing units by an endless chain 163.

Clutch 164 (Fig. 11) generally comprises a large diameter disc 165 having a flange 166 about the periphery thereof, to which is bolted two ring elements. The inner surface of these ring elements is provided with gear teeth 168 to form an internal gear hereinafter referred to as the flange 166. Disc 165 is also provided with an extensive hub portion 170 upon which the sprocket wheel 162 is freely mounted. Immediately adjacent the wheel 162 are a pair of friction discs 172, 173, one on each side, and secured to the hub 170 so as to rotate therewith. One disc 172 is held by a lock ring 174 and the other disc 173 is constantly urged toward the wheel by a spring 176 interposed between the disc 173 and an adjusting disc 178. The purpose of this construction is to protect the reels and power driving means against injury in case any of the mower units should become jammed by a tree branch or the like. Adjustment of the spring tension is effected by the ring 180 threaded on the hub 170.

A thick-walled sleeve 182 is fixed to the power shaft 184 for the mowing units and carries three clutch discs 186 keyed thereto. Interposed between the clutch discs 186 are a plurality of gear shaped rings 188 which form external gears having teeth 190 corresponding to the teeth 168 of the internal gear on the inner surface of the flange 166 and which constantly rotates with the flange. When the clutch discs 186 are pressed into firm contact with the rings 188 the discs 186 and the sleeve 182 also rotate, thereby driving the shaft 184. This pressing contact is effected by means of a clutch lever 192 pivotally connected to the frame 10 at 194. Lever 192 is formed with a circular section 196 having an inner ring 198 mounted therein. The inner ring 198 bears against the ends of three equally spaced cam levers 200, the opposite ends of which are provided with cam faces 201 that bear against the outermost clutch disc 186. An adjustable retaining ring 202 on the sleeve 182 furnishes a pivot point for the cam levers 200. Movement of lever 192 outwardly to the right causes the cam levers 200 to press the clutch discs 186 into contact with the rings 188 while movement to the left releases the discs 186 from the rings 188.

A sprocket wheel 204 is keyed to the end of the shaft 184 and is connected by a double sprocket wheel 208 on the wheel axle 56 by an endless chain 206. Double sprocket wheel 208 is, in turn, connected to a sprocket wheel 212 on the rotary shaft 72 of the front mowing unit by an endless chain 214. At its opposite end shaft 184 is provided with a beveled gear 216 that meshes with a similar gear 218 on a longitudinal shaft 220. A dog clutch 222, actuated by lever 224, is slidably keyed to the shaft 220 so as to be engageable with a sprocket wheel 226 freely mounted thereon. Sprocket wheel 226 is connected by an endless chain 228 to a sprocket wheel 230 on a longitudinal shaft 232 mounted in the bracket 110 suspended from the frame 10.

Referring now to Fig. 3 shaft 232 is rotatably mounted within the hollow rod 108 and carries a double sprocket wheel 234 at an end opposite to that of the wheel 230. An endless chain 236 for each sprocket of wheel 234 connects the wheel with a similar sprocket wheel 238 keyed to the end of a short shaft 240 rotatably mounted within the hollow casing of the hub 100 of the extension 96 and the stud shafts 102. The short shaft 240 on the left hand side of the machine as shown on Figure 3 is slightly longer than the corresponding short shaft 240R provided on the right hand side of the machine (see Figure 8). Thus the centers of the sprocket wheels exactly coincide with the centers of the pivot points for each link member 94. A bevel gear 242 mounted on the inner end of shaft 240 within the hub 100 meshes with a similar gear 244 on a transverse shaft 246. Shaft 246 is connected to the rotary shaft 72 of the cutting means by an internally splined sleeve 248. This arrangement of the transmission means permits pivotal movement of the mowing unit and connecting link member without changing the length of the system and without requiring any take-up devices for the endless chains. It will also be observed that if the clutches 164 and 222 are engaged the speed of the reels for the mowing units will be directly proportional to the speed of the engine.

The power take-off from the engine shaft 146 for the traction wheels 12 occurs at a point after the sprocket wheel 150. A clutch 250, similar to the clutch 164, is provided on the outer portion of the hollow sleeve 148. A disc 252 is keyed to the sleeve 148 on the engine shaft 146 and is provided with an integral clutch disc 254 and also with a movable clutch disc portion 256, the two discs being constantly urged apart by springs 258 only one of which is shown. The movable disc 256 is pressed into pressing contact with the clutch rings 260 by means of the roller arms 262 which carry rollers 266, 268 for engagement with a hardened ring 257 on the clutch disc 256 and a slidable cam member 270 respectively. Cam member 270 is mounted on a slide 272 actuated by the clutch lever 274. As the roller arms 262 are pivotally mounted on the adjusting ring 276 movement of the slide 272 toward the right (as shown in Fig. 9) will permit the disc 256 to be moved away from the rings 260. Movement to the left moves the disc 256 into contact with the rings.

Clutch 250 is also provided with a large diameter disc 278 having a flange 280 to which is bolted a ring element bearing internal gear teeth 282. On the hub 284 of the clutch, a sprocket wheel 286 is keyed for rotation therewith while the hub is rotatably mounted on the bushing 288. Sprocket 286 is connected by an endless chain 290 to a sprocket wheel 292 keyed to the shaft 156 of the gear box, or transmission 158. A shift lever 294 is provided for changing gears in the speed changer to vary the speed ratios between the engine shaft 146 and the traction wheels 12. A sprocket wheel 296, on the power output side of the transmission is connected by chain 298 to a sprocket wheel 300 on the wheel axle 56. Thus, it will be understood, a driving connection is provided from the engine power source through the speed changer to the traction wheels and a separate driving connection is provided from the engine power source to the mowing units. It will be noted that as the transmission or speed changer for the traction wheels is arranged after the power take-off for the mower units (the driving connections are separate) the speed ratio of the traction wheels with respect to engine speed may be varied without changing the speed ratio between the mowing units and the engine speed. The clip frequency of the mower can therefore be easily changed simply by changing the gears in the traction wheel transmission.

The invention in its broader aspects is not limited to the specific mechanisms shown and described but departures may be made therefrom within the scope of the accompanying claims without departing from the principles of the invention and without sacrificing its chief advantages.

What I claim is:

1. A power mower comprising a frame, an axle connected to the front of the frame and extending transversely thereof, a wheel rotatably mounted at each end of the axle to support and transport the front of the frame, at least one wheel rotatably mounted on the rear of the frame to support and transport the frame in conjunction with the first mentioned wheels, a power source mounted on the frame, a driving connection between the power source and at least one of the wheels to drive the wheel and move the frame, a mowing unit having cutting means, and means for attaching the mowing unit to the front of the frame, said attaching means comprising a yoke member pivotally mounted on said axle and extending forwardly of the frame to pivot about a substantially horizontal axis, and said attaching means also comprising a connecting member rotatably connecting the mowing unit and the center of the yoke, said connecting member being rotatable about a longitudinal axis of the frame.

2. The subject matter of claim 1 characterized by the fact that said connecting member is provided with a longitudinal extension, the yoke is provided with a bearing adapted to rotatably receive the longitudinal extension, said mowing unit has two end portions at opposite ends thereof, a roller is mounted on each end portion of the mowing unit, and the yoke has a pair of guide member runners secured to and located on the yoke in registry with said rollers to engage the rollers and to provide a track for each roller whereby guided and supported up and down movement of the mowing unit over irregular terrain is facilitated.

References Cited in the file of this patent

UNITED STATES PATENTS

| | | |
|---|---|---|
| 2,509,993 | Soss | May 30, 1950 |
| 2,696,705 | Greber | Dec. 14, 1954 |
| 2,750,726 | Boucard et al. | June 19, 1956 |